United States Patent [19]

Kurz et al.

[11] Patent Number: 5,034,939
[45] Date of Patent: Jul. 23, 1991

[54] APPARATUS FOR SELECTIVELY PLAYING BACK AND RECORDING DATA ON A DISK IN WHICH THE BIT ERROR RATE IS HELD MINIMUM

[75] Inventors: Arthur Kurz, Karlsruhe; Dietmar Uhde, Villingen-Schwenningen, both of Fed. Rep. of Germany

[73] Assignee: Deutsche Thomson-Brandt GmbH, Villingen, Fed. Rep. of Germany

[21] Appl. No.: 274,055

[22] PCT Filed: Feb. 10, 1988

[86] PCT No.: PCT/EP88/00097
§ 371 Date: Oct. 11, 1988
§ 102(e) Date: Oct. 11, 1988

[87] PCT Pub. No.: WO88/06336
PCT Pub. Date: Aug. 25, 1988

[30] Foreign Application Priority Data

Feb. 14, 1987 [DE] Fed. Rep. of Germany ....... 3704718

[51] Int. Cl.$^5$ .............................................. G11B 7/00
[52] U.S. Cl. .............................. 369/44.32; 369/44.25; 369/44.34
[58] Field of Search ..................... 369/44.11, 44.34, 54, 369/58, 50, 59, 44.32, 44.33; 360/53

[56] References Cited

U.S. PATENT DOCUMENTS

| Re. 31,166 | 3/1983 | Korda ................................... 360/53 |
| 4,755,980 | 7/1988 | Yoshimaru et al. .................. 369/54 |

FOREIGN PATENT DOCUMENTS

| 0095766 | 12/1983 | European Pat. Off. . |
| 61-208634 | 9/1986 | Japan . |
| 61-250842 | 11/1986 | Japan . |
| 2016744 | 9/1979 | United Kingdom . |

Primary Examiner—Donald McElheny, Jr.
Attorney, Agent, or Firm—Max Fogiel

[57] ABSTRACT

An arrangement for selectively playing back and recording data in which a rotating disk-shaped recording medium is provided with data storage tracks. An optical system reads the stored data by guiding a light beam along the data storage tracks. The data read by the optical pickup system is decoded by a decoder which has an error output that emits a pulse for every bit error. The light beam strikes the disk-shaped recording medium at an angle and has a vector component which is tangential to the recording medium or disk, so that when the angle is 90°, the vector component is zero. The bit errors are applied to a counter that provides the corresponding bit-error rate and provides a signal for controlling the adjustment for varying the vector component so as to maintain the bit-error rate below a predetermined threshold.

9 Claims, 2 Drawing Sheets

APPARATUS FOR SELECTIVELY PLAYING BACK AND RECORDING DATA ON A DISK IN WHICH THE BIT ERROR RATE IS HELD MINIMUM

BACKGROUND OF THE INVENTION

The invention concerns equipment for playing back and optionally also recording data that are read by an optical pick-up system by means of guiding a beam of light along the data-storage tracks of a rotating disk-shaped recorded medium and that are then decoded in a decoder that emits a pulse from its error output terminal for every bit error.

SUMMARY OF THE INVENTION

Equipment of this type, compact-disk players, optico-magnetic equipment for playback and recording, DRAW-disk recorders and players, and videodisk players for example, are equipped with an optical pick-up system consisting of a laser diode, several lenses, a prism beam divider, and a photodetector. The design and function of an optical pick-up are described on pages 209 to 215 of Electronic Components and Applications, Vol. 6, No. 4, (1984).

BRIEF DESCRIPTION OF THE DRAWINGS

The lenses focus the beam of light emitted by the laser diode onto the compact disk, whence it is reflected onto the photodetector. The data stored on the compact disk are obtained along with actual values for the focusing circuit and for the tracking circuit from the output signal from the photodetector. The actual value for the focusing circuit is called the "focusing error" and the actual value for the tracking circuit the "radial tracking error" in the aforesaid reference.

DESCRIPTION OF THE PREFERRED EMBODIMENTS

Figure 1:
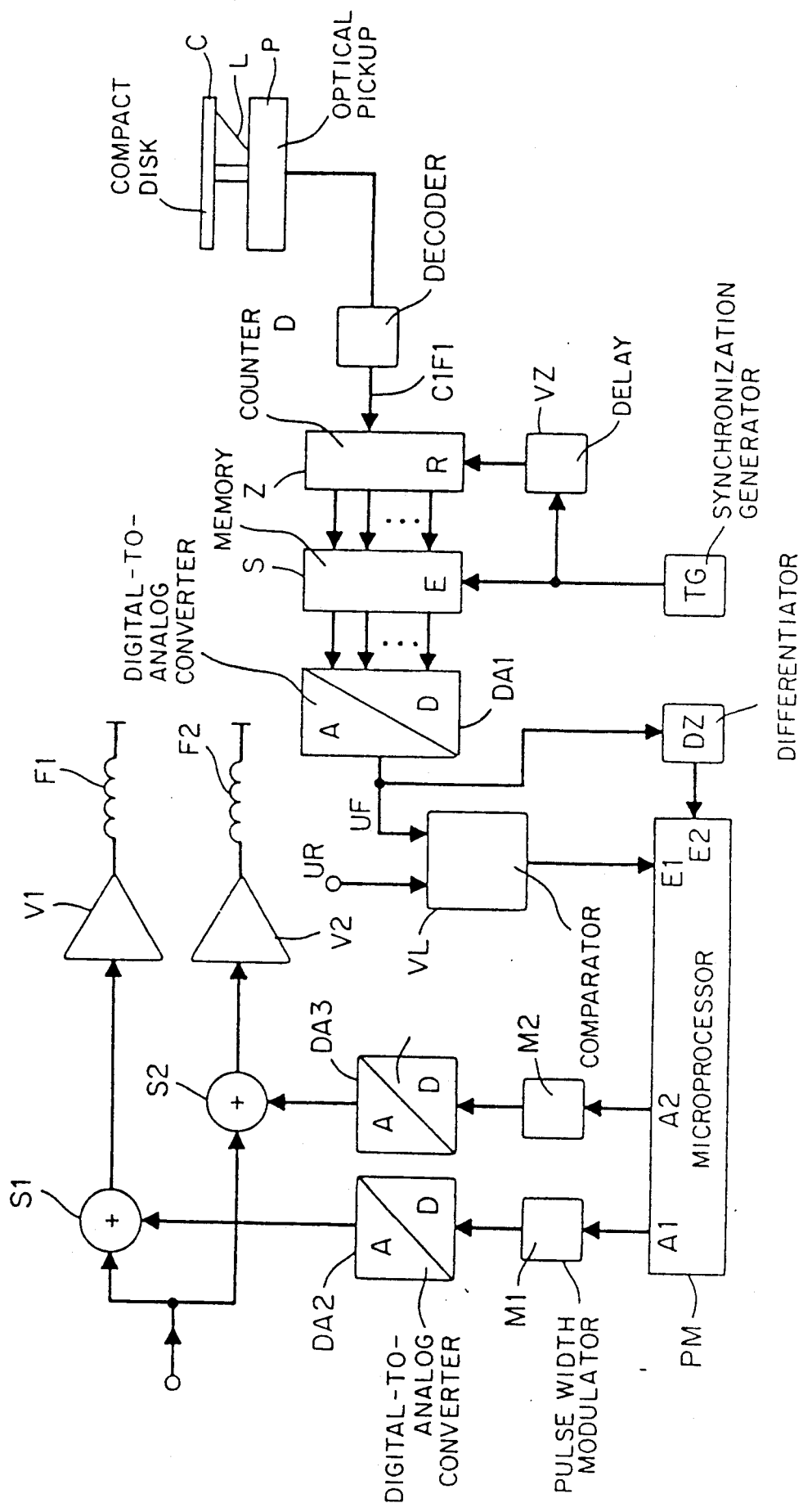

The component that controls the focusing circuit is a coil, which generates a magnetic field that displaces an objective lens along the optical axis. The focusing circuit, in displacing the lens, keeps the beam of light emitted by the laser diode constantly focused on the compact disk. The tracking circuit, which is also often called the "radial drive mechanism," displaces the optical pick-up system radially in relation to the compact disk, keeping the beam of light positioned on the spiral data-storage tracks on the disk.

The radial drive mechanism in some equipment comprises a "coarse drive mechanism" and a "fine drive mechanism." The coarse drive mechanism can for example be a spindle that radially displaces the overall optical pick-up system, consisting of the laser diode, the lenses, the prism beam divider, and the photodetector. The fine drive mechanism tilts the beam of light radially at a small prescribed angle, allowing it to travel a short distance along the radius of the compact disk as the result of the tilting motion alone. In other words, the fine drive mechanism varies the radial vector component of the beam of light in relation to the compact disk. The tangential angle at which the beam strikes the disk, on the other hand, is always 90° C. The vector component of the beam of light tangential to the compact disk is accordingly zero.

The data signals emitted by the photodetector are, as already mentioned herein, decoded in a decoder that emits a pulse at its error output terminal, the C1F1 output terminal, at every bit error.

The number of bit errors depends, among other factors, on the angle at which the beam of light strikes the compact disk at an angle thereto. Since a compact disk, however, is not perfectly flat and circular but is subject to deviations in tolerance, the right angle at which the beam of light tangentially strikes the compact disk cannot be optimally established for all scanning points when the compact-disk player is manufactured. This situation increases the number of bit errors.

The object of the invention, accordingly, is to decrease the number of bit errors in equipment for playing back data.

This object is attained in accordance with the invention in that a signal for controlling an adjustment stage is obtained from the bit-error rate and is employed to vary the vector component of the beam of light that is tangential to the recorded medium.

In the drawings,

FIG. 1 illustrates one embodiment of the invention and

Figure 2:
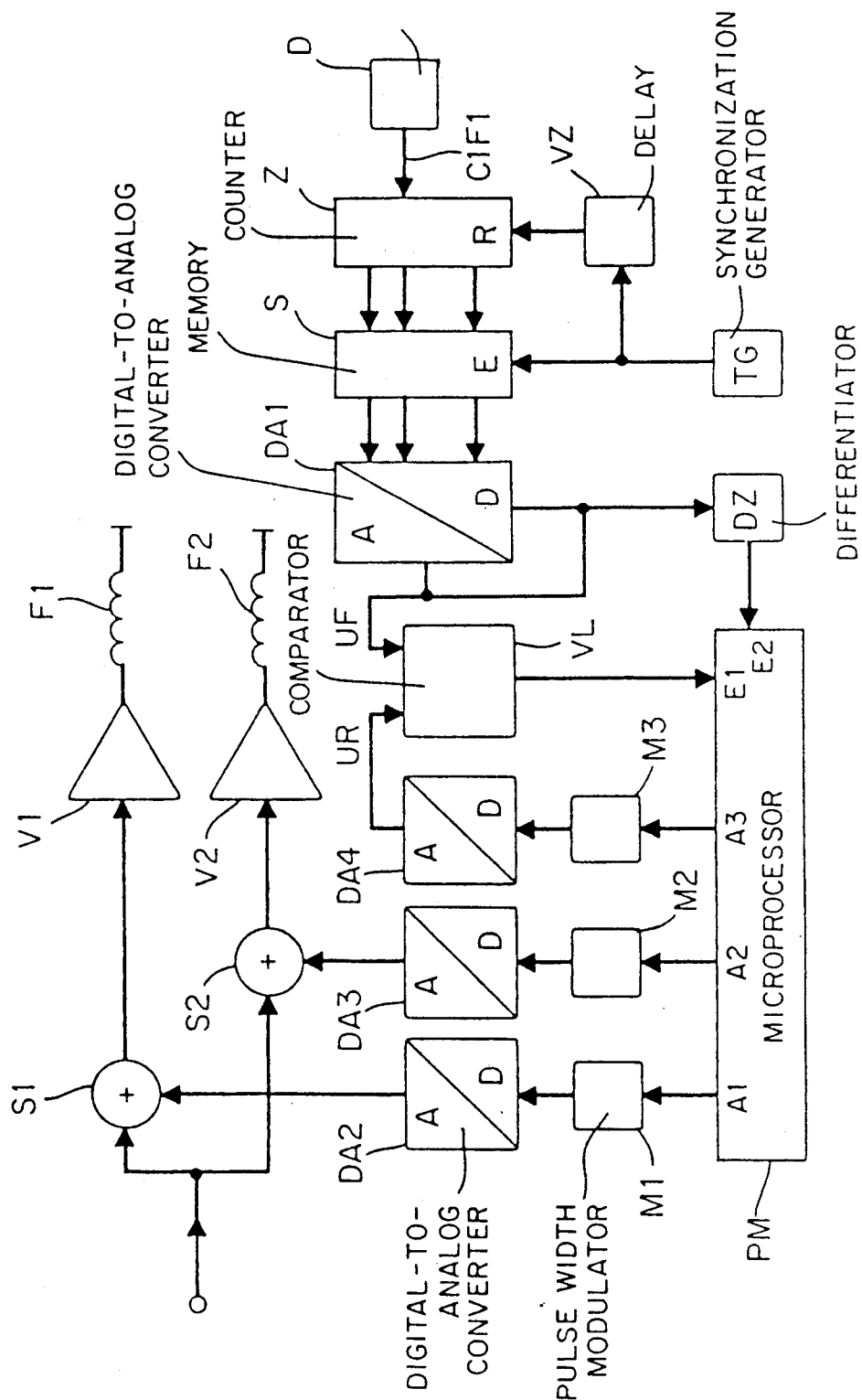

FIG. 2 illustrates another embodiment of the invention.

The embodiment illustrated in FIG. 1 will now be specified and its function explained.

What is called the error output terminal of the decoder D illustrated in FIG. 1 emits a pulse for every bit error and is connected to the input terminal of a counter Z, the output terminals of which are connected to the input terminals of a memory S. The output terminal of a synchronization generator TG is directly connected to the enable input terminal E of memory S and, by way of a delay stage VZ, to the reset input terminal R of counter Z. The output terminals of memory S are connected to the input terminals of a digital-to-analog converter DA1. The output terminal of the converter is connected to the input terminal of a differentiator DZ and to the first input terminal of a comparator VL, which has a reference voltage UR at its second input terminal. The output terminal of comparator VL is connected to the input terminal E1 and the output terminal of differentiator DZ to the input terminal E2 of controls PM, a microprocessor for example. One output terminal A of microprocessor PM is connected to the input terminal of a pulse-width modulator M1, the output terminal of which is connected to the input terminal of a digital-to-analog converter DA2. One output terminal A2 of microprocessor PM is connected to the input terminal of another pulse-width modulator M2, the output terminal of which is connected to the input terminal of a digital-to-analog converter DA3. The output terminal of digital-to-analog converter DA2 is connected to the first input terminal of a summation point S1, the output terminal of which is connected to the input terminal of an amplifier V1, whereas the output terminal of digital-to-analog converter DA3 is connected to the first input terminal of a summation point S2, the output terminal of which is connected to the input terminal of an amplifier V2. The output terminal of amplifier V1 is connected to a coil F1 and the output terminal of amplifier V2 to another coil F2. Coils F1 and F2 constitute an adjustment stage that varies the angle, to be called the tangential angle in what follows, at which the beam of light L of pickup P tangentially strikes the compact disk C. Since the stage that adjusts the focusing circuit is also a coil, it can, as illustrated in FIG. 1, also be exploited as a stage for adjusting the tangential angle if it is constructed of two symmetrical halves, for which purpose the actual value of the focusing circuit, the focusing error, is forwarded to the first input terminal of summation points S1 and S2.

How the invention operates will now be explained.

Since, at every bit error, decoder D emits a counting pulse to counter Z, the initial setting of which is zero, every bit error increases the setting of the counter by one. Synchronization generator TG now periodically resets counter Z by forwarding a pulse to its resetting input terminal. Synchronization generator TG, however, simultaneously releases the pulse to the enable input terminal of memory S, causing it to release its contents to digital-to-analog converter DA1 in order to accommodate the state of counter Z. The pulse generated by synchronization generator TG is forwarded undelayed to the enable input terminal of memory S but, due to the intervention of delaying stage VZ, to the resetting input terminal R of counter Z subject to a delay, to allow memory S to accommodate the state of counter Z before it is reset. The state of counter Z, which is proportional to the bit-error rate, the number of bit errors between each pair of subsequent pulses from synchronization generator TG, is converted in digital-to-analog converter DA 1 into an analog voltage UF, which is accordingly also proportional to the bit-error rate.

As long as the analog voltage UF at the output terminal of digital-to-analog converter DA1, which will be called the "test voltage" in what follows, is lower than reference voltage UR, the tangential angle will not change. Once the bit-error rate increases to the extent that the test voltage is higher than the reference voltage, comparator VL will vary its output signal, signaling microprocessor PM that the bit-error rate is too high. Test voltage UF, however, does not make it possible to tell what direction the tangential angle will have to be varied in in order to decrease the bit-error rate. Microprocessor PM will accordingly generate a signal at each of its output terminals A1 and A2, causing pulse-width modulators M1 and M2 to emit pulse-shaped signals that are converted by digital-to-analog converters DA2 and DA3 and forwarded to coils F1 and F2. Coils F1 and F2, which constitute the component that adjusts the tangential angle, now initially vary the angle in one direction. If differentiator DZ determines during a prescribed interval of time, during the following two synchronization pulses from synchronization generator TG for example, that the bit-error rate is decreasing, the tangential angle will continue to be varied in the same direction until comparator VL signals microprocessor PM that test voltage UF has decreased to below reference voltage UR.

If differentiator DZ determines during the aforesaid interval of time that the bit-error rate is not decreasing, microprocessor PM will assume that it has adjusted the tangential angle in the wrong direction. It will accordingly emit signals at its output terminals A1 and A2 to vary the tangential angle in the other direction until test voltage UF decreases to below the reference voltage.

These measures will continue varying the tangential angle, the angle at which the beam of light strikes the compact disk at an angle, in such a way as to maintain the bit-error rate below a prescribed threshold. Irregularities in the surface of the compact disk will accordingly no longer entail the essential increase in the bit-error rate typical of a compact-disk player in which the tangential angle is adjusted constant.

Comparator VL, counter Z, memory S, differentiator DZ, and digital-to-analog converter can also be integrated into microprocessor PM. Microprocessor PM also makes it possible to vary the tangential angle until the bit-error rate is at a minimum. In this case the only purpose of the signal at the output terminal of comparator VL is to initiate adjustment of the tangential angle. The regulation process, however, does not terminate as soon as test voltage UF decreases to below reference voltage UR, but only once differentiator DZ determines that test voltage UF, and hence the bit-error rate is at a minimum and will stop decreasing. The result is a greater improvement in sound reproduction.

FIG. 2 illustrates another embodiment, which differs from the first in that one output terminal A3 of microprocessor PM is connected to the input terminal of a pulse-width modulator M3. The output terminal of the pulse-width modulator is connected to the input terminal of a digital-to-analog converter DA4, from the output terminal of which the reference voltage UR for the second input terminal of comparator VL can be obtained. The advantage of this embodiment is that the threshold at which the tangential angle begins to be adjusted can be set. In other words, the sensitivity of the circuit that controls the tangential angle can be adjusted.

The invention is appropriate not only for compact-disk players and videodisk players but can also be embodied in optico-magnetic recording and playback equipment wherein, as in audiotape equipment, data can be recorded, played back, and erased as often as desired. Equipment for recording and playing back DRAW-disks, which, like PROM equipment, allows data to be recorded only once and it is impossible to erase and re-record or to record over already recorded data, is also to be considered.

What is claimed is:

1. An arrangement for selectively playing back and recording data comprising: a rotating disk-shaped recording medium having data-storage tracks; an optical pick-up system for reading said data by guiding a light beam along said data-storage tracks; decoder means for decoding the data read by said optical pick-up system; said decoder having an error output for emitting a pulse for every bit error; said light beam striking said disk-shaped recording medium at an angle to said recording medium and having a vector component tangential to said recording medium so that when said angle is 90° said vector component is zero; means for adjusting said angle, means receiving bit errors from said decoder and having a bit-error rate providing a signal for controlling said adjusting means to vary said vector component for maintaining the bit-error rate below a predetermined threshold.

2. An arrangement as defined in claim 1, including counter means having an input connected to said output of said decoder; comparator means, said counter having a state compared by said comparator means with a reference parameter, said comparator means providing a signal for controlling said adjusting means.

3. An arrangement as defined in claim 2, wherein said reference parameter is variable.

4. An arrangement as defined in claim 2, including digital-to-analog converter means for converting the stage of said counter means to an analog voltage, said reference parameter comprises a reference voltage, said comparator comparing said analog voltage with said reference voltage.

5. An arrangement as defined in claim 4, including regulator means having an output connected to said adjusting means, said comparator means having an output connected to said regulator means.

6. An arrangement as defined in claim 5, wherein said regulator means varies said vector component through said adjusting means until said analog voltage decreases below said reference voltage.

7. An arrangement as defined in claim 5, wherein said error output of said decoder is connected to said counter means; memory means connected to an output of said counter means; a first digital-to-analog converter having an input connected to an output of said memory means; a synchronization generator having an output connected to an enable input of said memory means; delay means connected between the output of said synchronization generator and a reset input of said counter means; differentiator means, said first digital-to-analog converter having an output connected to a first input of said comparator means and to an input of said differentiator means; a control circuit having a first input connected to the output of said comparator means, said reference voltage being at a second input of said comparator means; said control circuit having a second input connected to an output of said differentiator means, said control circuit comprises a microprocessor; a first pulse-width modulator having an input connected to a first output of said control circuit; a second digital-to-analog converter having an input connected to an output of said first pulse-width modulator; a second pulse-width modulator having an input connected to a second output of said control circuit; a third digital-to-analog converter having an input connected to an output of said second pulse width modulator; summing means having a first input connected to an output of said second digital-to-analog converter; a first amplifier having an input connected to an output of said summing means; a second summation means having a first input connected to an output of said third digital-to-analog converter; a second amplifier with input connected to an output of said second summation means; said first amplifier and said second amplifier having outputs connected to said adjusting means.

8. An arrangement as defined in claim 7, including a third pulse-width modulator with input connected to a third output of said control circuit; a fourth digital-to-analog converter with input connected to an output of said third pulse-width modulator; said fourth digital-to-analog converter having an output connected to a second input of said comparator means.

9. An arrangement for selectively playing back and recording data comprising: a rotating disk-shaped recording medium having data-storage tracks; an optical pick-up system for reading said data by guiding a light beam along said data-storage tracks; decoder means for decoding the data read by said optical pick-up system; said decoder having an error output for emitting a pulse for every bit error; said light beam striking said disk-shaped recording medium at an angle to said recording medium and having a vector component tangential to said recording medium so that when said angle is 90° said vector component is zero; means for adjusting said angle, means receiving bit errors from said decoder and having a bit-error error rate providing a signal for controlling said adjusting means to vary said vector component for maintaining the bit-error rate below a predetermined threshold; counter means having an input connected to the error output of said decoder means; comparator means, said counter means having a state compared by said comparator means with a reference parameter, said comparator means having an output providing a signal for controlling said adjusting means, the state of said counter means being converted into an analog voltage and compared by said comparator means with said reference parameter, said reference parameter comprising a reference voltage; regulator means connected to the output of said comparator means, said regulator means having an output connected to said adjusting means; said regulator means varying said vector component through said adjusting means until said analog voltage corresponding to the state of said counter means decreases below said reference voltage, said reference voltage being variable; said counter means having memory means connected to an output of said counter means; a first digital-to-analog converter having an input connected to an output of said memory mans; a synchronization generator having an output connected to an enable input of said memory means; delay means connected between the output of said synchronization generator and a reset input of said counter means; differentiator means, said first digital-to-analog converter having an output connected to a first input of said comparator means and to an input of said differentiator means; a control circuit having a first input connected to the output of said comparator means, said reference voltage being at a second input of said comparator means; said control circuit having a second input connected to an output of said differentiator means, said control circuit comprises a microprocessor; a first pulse-width modulator having an input connected to a first output of said control circuit; a second digital-to-analog converter having an input connected to an output of said first pulse-width modulator; a second pulse-width modulator having an input connected to a second output of said control circuit; a third digital-to-analog converter having an input connected to an output of said second pulse width modulator; summing means having a first input connected to an output of said second digital-to-analog converter; a first amplifier having an input connected to an output of said summing means; a second summation means having a first input connected to an output of said third digital-to-analog converter; a second amplifier with input connected to an output of said second summation means; said first amplifier and said second amplifier having outputs connected to said adjusting means; a third pulse width modulator having an input connected to a third output of said control circuit; a fourth digital-to-analog converter having an input connected to an output of said third pulse-width modulator, said fourth digital-to-analog converter having an output connected to a second input of said comparator means.

* * * * *